No. 809,280. PATENTED JAN. 9, 1906.
E. W. BROOMALL.
BEARING FOR VERTICAL SHAFTS.
APPLICATION FILED JUNE 24, 1905.
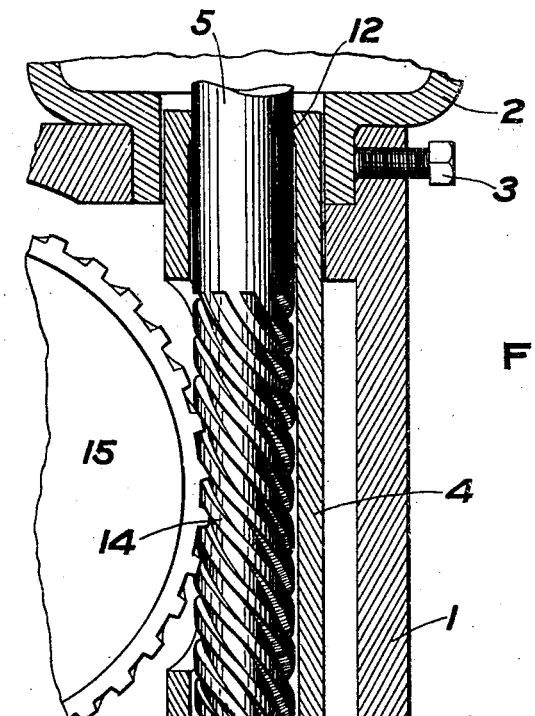
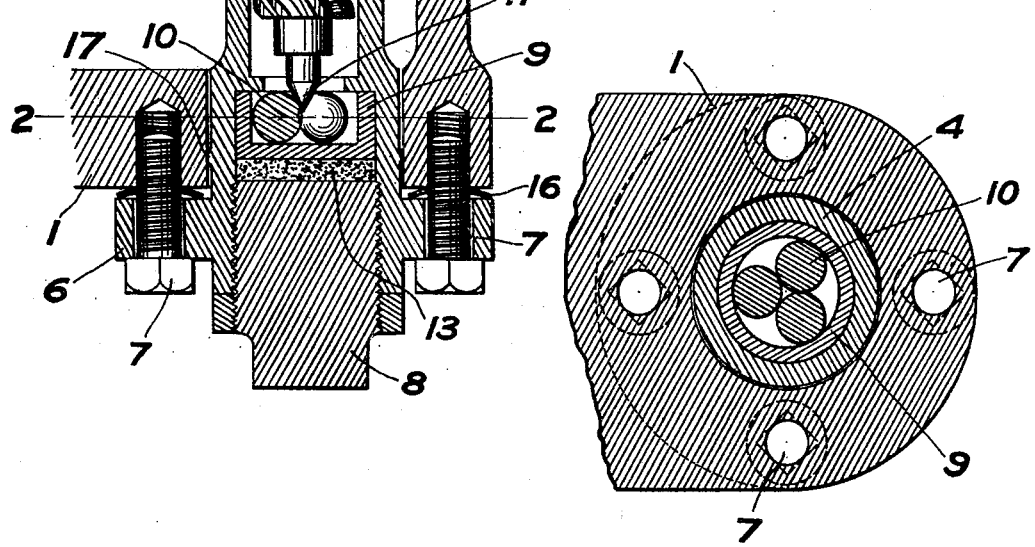
WITNESSES:
Clarence W. Carroll.
L. Thon.
INVENTOR:
Edgar W. Broomall
by Osgood & Davis
his attorneys

UNITED STATES PATENT OFFICE.

EDGAR W. BROOMALL, OF ROCHESTER, NEW YORK.

BEARING FOR VERTICAL SHAFTS.

No. 809,280.  Specification of Letters Patent.  Patented Jan. 9, 1906.

Application filed June 24, 1905. Serial No. 266,885.

*To all whom it may concern:*

Be it known that I, EDGAR W. BROOMALL, a citizen of the United States, and a resident of Rochester, in the county of Monroe and State of New York, have invented certain new and useful Improvements in Bearings for Vertical Shafts, of which the following is a specification.

This invention relates to bearings for vertical shafts, and is particularly adapted for shafts that revolve at a high rate of speed—such, for example, as those of centrifugal cream-separators.

The objects of the invention are to reduce the friction of the bearing parts and to enable the shaft to deviate somewhat under thrust of the driving means from the true vertical without binding or bending.

In the drawings, Figure 1 is a vertical section of part of a centrifugal cream-separator, showing the vertical shaft; and Fig. 2 is a cross-section on the line 2 2 of Fig. 1.

1 is the frame of the machine.

2 is the separating-bowl, which is locked to the main frame, as by the bolt 3, and 4 is a vertical sleeve for the shaft 5. The upper end of the sleeve enters the bowl 2, and its lower end has a flange 6, by which it is attached to the main frame by means of bolts 7. Space is left between the sleeve 4 and the parts that surround it, and the holes in the flange 6, that receive the bolts 7, respectively, are somewhat larger than the bolts, both of which features are shown in Fig. 1, so that the sleeve may tilt from its normal position, in which it is shown in said Fig. 1. A plug 8, screwed into the lower end of the sleeve 4, supports the ball-cup 9. Three balls 10 are shown in the cup, which afford a step-bearing for the end 11 of the shaft 5. The end 11 of the shaft is represented as terminating in a point that enters between the three balls 10. The upper end of the shaft is journaled in the inwardly-projecting flange 12 on the sleeve 4; but otherwise the sleeve 4 does not come in contact with the shaft.

A cushion 13, of rubber or other suitable material, is shown between the plug 8 and cup 9. The shaft has a worm 14, which is adapted to mesh with a driving-gear 15.

Compressible springs 16 are interposed between the frame 1 and the flange 6 on the sleeve 4. In the drawings cupped disks, of resilient material, are shown, which are perforated centrally to receive the bolts 7, respectively, whereby they are retained in place.

When the shaft is put in motion and also when force is exerted to retard or stop its rotation, the inertia of the rotary parts tends to cause the shaft to be forced out of its vertical position. Unless provision is made for the shaft to yield to this horizontal thrust it is apt to bend, and so to be injured, and the bearings and other parts may also suffer injury. In the present invention provision is made whereby the shaft may yield to the horizontal thrust, for the space between the upper end of the sleeve 4 and the parts surrounding it enables the sleeve 4 to tilt, carrying with it the shaft 5 and compressing the outer springs 16. When the horizontal thrust is spent, the springs 16 return the sleeve 4 and shaft 5 to their vertical positions. The resistance of the springs 16 is sufficient to maintain the shaft normally vertical, and the space between the sleeve and its surrounding parts will enable the shaft to tilt sufficiently to relieve it from such strain as might otherwise do damage to it or other parts of the machine.

Lest the springs 16 may not prevent the lower end of the sleeve from shifting laterally under the horizontal thrust of the driver a pivot-ledge 17 is formed on the sleeve, which contacts with the surrounding frame.

What I claim is—

1. The combination with a suitable support, of a shaft-supporting sleeve mounted in said support and open at one side for the driving means, a step-bearing in the lower end of the sleeve, a shaft mounted in the sleeve and stepped at its lower end in said step-bearing, and means for yieldingly connecting the lower end of the sleeve to the support.

2. The combination with a suitable support, of a sleeve provided with an apertured flange at its lower end and passed upwardly through an opening in said support, screws passed loosely through the flange-aperture upwardly into the lower side of the support, and springs between the flange and support.

3. The combination with a suitable support, of a shaft-supporting sleeve open at one side for the driving connections, a step-bearing in the lower end of the sleeve for said shaft, an apertured flange being provided on the sleeve below the support, screws passed loosely through said flange-apertures into the lower side of said support, and springs on the screws between the flange and support.

4. The combination with a support and a shaft-supporting sleeve passed upwardly through an opening in the support and there provided with an annular pivot-ledge, screws passed up loosely through the flange-apertures into the lower side of the support, springs between the flange and support, of a cup in the lower portion of the sleeve, three balls in the cup, a plug closing the lower end of the sleeve and holding the cup in place, and a shaft within the sleeve and having a pointed lower end stepped between the balls.

EDGAR W. BROOMALL.

Witnesses:
D. GURNEE,
C. W. CARROLL.